US005193751A

United States Patent [19]

Mori et al.

[11] Patent Number: 5,193,751

[45] Date of Patent: Mar. 16, 1993

[54] COLORING FINE PARTICLES AND TONER FOR DEVELOPING ELECTROSTATIC IMAGES USING THE SAME

[75] Inventors: Yoshikuni Mori; Hayato Ikeda, both of Takatsuki; Mitsuo Kushino, Minoo; Nobuaki Urashima, Takatsuki; Keiichi Uehara, Suita; Masuji Izubayashi, Nishinomiya; Yoshinori Sano, Kobe, all of Japan

[73] Assignee: Nippon Shokubai Kagaku Kogyo Co., Ltd., Osaka, Japan

[21] Appl. No.: 738,136

[22] Filed: Jul. 30, 1991

Related U.S. Application Data

[62] Division of Ser. No. 400,065, Aug. 29, 1989, Pat. No. 5,080,992.

[30] Foreign Application Priority Data

Aug. 30, 1988 [JP] Japan ................................ 63-213827
Apr. 17, 1989 [JP] Japan ................................ 1-95419

[51] Int. Cl.[5] ................................ B01J 13/00
[52] U.S. Cl. ................................ 241/3; 241/23; 241/101.4
[58] Field of Search ................................ 241/3, 23, 101.4

[56] References Cited

U.S. PATENT DOCUMENTS

| | | | |
|---|---|---|---|
| 2,857,270 | 10/1958 | Brundun | 241/3 X |
| 3,058,967 | 10/1962 | Nickerson | 241/3 X |
| 3,634,251 | 1/1972 | Maeda et al. . | |
| 4,040,570 | 8/1977 | Wiedemann et al. | 241/3 |
| 4,638,952 | 1/1987 | Williams et al. | 241/3 |
| 4,749,638 | 1/1988 | Tsushima et al. . | |
| 4,752,522 | 6/1988 | Sugimori et al. | 428/211 |
| 4,789,613 | 12/1988 | Ohtani et al. . | |
| 4,794,065 | 12/1988 | Hedvall et al. | 430/111 |
| 4,983,488 | 1/1991 | Tan et al. . | |
| 5,066,560 | 11/1991 | Tan et al. . | |

FOREIGN PATENT DOCUMENTS

| | | |
|---|---|---|
| 36-10231 | 7/1961 | Japan . |
| 43-10799 | 5/1968 | Japan . |
| 47-51830 | 12/1972 | Japan . |
| 60-21055 | 2/1985 | Japan . |
| 1-182855 | 7/1989 | Japan . |
| 2003885A | 3/1979 | United Kingdom . |
| 1583564 | 1/1981 | United Kingdom . |

OTHER PUBLICATIONS

Xerox Disclosure Journal, vol. 4, No. 5, p. 619, Sep. 1979, Stamford, CT, "Method for Obtaining Conductive Black Toner".

Patent Abstracts of Japan, vol. 13, No. 464, corresponding to Japanese Patent Pub. 1-182855, Oct. 20, 1989.

Patent Abstracts of Japan, vol. 9, No. 141, corresponding to Japanese Patent Pub. 60-21055, Jun. 15, 1989.

*Primary Examiner*—Mark Rosenbaum
*Assistant Examiner*—Frances Chin
*Attorney, Agent, or Firm*—Burns, Doane, Swecker & Mathis

[57] ABSTRACT

Coloring fine particles produced by heating spheroidal coloring fine particles with an average fine particle diameter of 1-100 μm obtained by suspension polymerization to a temperature of 30° to 200° C., thereby causing the particles to fuse together in a block without completely destroying the particle interfaces, and then crushing the block to substantially the same average particle diameter of the spheroidal coloring particles before melting, and a toner for developing electrostatic images using the same.

10 Claims, 1 Drawing Sheet

COLORING FINE PARTICLES AND TONER FOR DEVELOPING ELECTROSTATIC IMAGES USING THE SAME

This application is a division of application Ser. No. 400,065, filed Aug. 29, 1989 now U.S. Pat. No. 5,080,992.

BACKGROUND OF THE INVENTION

1. Field of the Invention

This invention relates to coloring fine particles and toners for developing electrostatic images using said particles. More specifically, it relates to coloring fine particles wherein a coloring agent is uniformly dispersed throughout and the particle surface is modified, so rendering the particles suitable for use as toners, paints, inks, resinous coloring materials and the like, and whereby the use of said coloring fine particles as toners in laser printers, liquid crystal printers and other printing devices to develop an electrostatic image permits a clear image to be obtained.

2. Description of the Prior Art

In electronic photography, a latent electrical image is formed on a photosensitive support comprising a photoconducting material such as selenium, lead oxide or cadmium sulfide, developed by a powder developer, transferred to paper or another support, and then fixed.

In the prior art, the toners used for developing electrostatic images were generally manufactured by adding coloring agents and other additives (charge control agents, offset inhibitors and lubricants, etc. to a thermoplastic resin, melting the mixture to disperse these agents in the resin, microgrinding the solid obtained, and classifying the resulting particles so as to obtain coloring fine particles with the desired particle diameter.

There were, however, several disadvantages associated with the manufacture of toner by this grinding method. Firstly, the method necessarily involved a large number of processes including manufacture of the resin, kneading the resin together with coloring agents and other additives, grinding the solid obtained, and classifying the ground particles to obtain coloring fine particles with the desired particle diameter. A considerable amount of equipment was consequently involved, and the toner manufactured by this method was necessarily expensive. In particular, the classification process was an essential step to obtain toner with the optimum range of particle diameters to produce a clear image with very little fogging, but there were problems as regards productivity and yield. Secondly, in the kneading process, it was extremely difficult to distribute the coloring agent and other additives uniformly in the resin. As a result, the coloring agent and charge control agents were poorly distributed in the toner, the frictional charge of individual particles was different, and the degree of resolution of the resulting image was poor. Moreover, there is a tendency to make toner particles smaller as this is a necessary condition to achieve higher quality images, so such problems are liable to worsen in future. There is a limit to the ability of present grinding machines to produce toners with small particles, but even if small particles can be obtained, the coloring agents and charge control agents are poorly distributed so there is considerable scattering of the electrostatic charge.

In order to resolve these various problems associated with toners produced by grinding methods, other methods of manufacturing toners have been proposed such as emulsification polymerization and suspension polymerization (Patent Publications Nos. SHO 36(1961)-10231, SHO 43(1968)-10799, SHO 47(1972)-51830, and SHO 51(1976)-14895). In one such method, coloring materials such as carbon black and other additives are added to a polymerizable monomer, and emulsification or suspension polymerization is carried out so as to synthesize a toner containing coloring material in one step. This provides a considerable improvement on conventional grinding methods, and as no grinding process is involved whatsoever, there is no need to improve the brittleness of the product. Moreover, as the particles formed are spheroidal, they have excellent fluidity and their frictional charge is uniform.

There are, however, some problems even with the manufacture of toners by polymerization. Firstly, as the hydrophilic substances such as dispersing agents and surfactants used in the polymerization, cannot be completely removed even by washing and remain on the surface of the toner, the electrostatic properties of the toner are easily affected by the environment. Secondly, as the toner particles obtained by polymerization are spheroidal and have a very smooth surface, toner which adheres to the photosensitive support is difficult to remove and cleaning is ineffective.

Various methods have been proposed to resolve these problems, for example as disclosed in Japanese Patent Laid-Open Nos. SHO 61(1986)-255354, SHO 53(1978)-17736, SHO 63(1988)-17460, and SHO 61(1986)-167956, but either they were not completely effective or they led to increased cost.

An object of the present invention is, therefore, to provide a new type of coloring fine particles, a method for manufacturing them, and a toner for developing electrostatic images using these particles.

Another object of the present invention is to provide coloring particles wherein a coloring agent is uniformly distributed throughout and the particle surface is modified, a method for manufacturing the particles, and a toner using the particles for developing a clear, electrostatic image.

SUMMARY OF THE INVENTION

The objects of the present invention are achieved by coloring fine particles, produced by heating spheroidal coloring fine particles obtained by suspension polymerization with an average particle diameter of 1 to 100 μm to a temperature of 30° to 200° C., thereby causing the particles to fuse together in a block without completely destroying the particle interfaces, and then crushing the block to substantially the same average particle diameter as the spheroidal coloring particle before melting.

The objects of the present invention are achieved also by a method of manufacturing coloring fine particles, produced by heating spheroidal coloring fine particles obtained by suspension polymerization with an average particle diameter of 1 to 100 μm to a temperature of 30° to 200° C., thereby causing the particles to fuse together in a block without completely destroying the particle interfaces, and then crushing the block to substantially the same average particle diameter as the spheroidal coloring particle before melting.

The objects of the present invention are achieved also by a toner for developing electrostatic images using coloring fine particles, produced by heating spheroidal fine coloring particles obtained by suspension polymerization with an average particle diameter of 1 to 100 μm to a temperature of 30° to 200° C., thereby causing the particles to fuse together in a block without completely destroying the particle interfaces, and then crushing the block to substantially the same average particle diameter as the spheroidal coloring particle.

The coloring fine particles of this invention are produced by heating, under certain conditions, the spheroidal fine particles obtained by suspension polymerization, and then crushing the product. The shape of the coloring agent thus obtained is not specifically limited, but for example it is macroscopically spheroidal and it may be a particle having unevenness on the surface or a non-spheroidal particle. Therefore, the dispersing agent such as polyvinyl alcohol and the like used in the suspension polymerization is extremely decreased from the surface of the particles, and variation of the properties based on the change of humidity is almost eliminated. Further, after mixing other fine particles with the spheroidal fine particles, when the mixture thus obtained is heat treated, the surfactant used in the suspension polymerization is extremely decreased from the surface of the particles. The fine coloring particles of this invention are therefore very suitable for use as a toner for developing electrostatic images, as paints and inks, and as pigments or property modifiers for resin compositions.

The toner of this invention uses said coloring fine particles, so it has good cleaning properties compared to the spheroidal coloring fine particles, and it always provides a high-quality image without fogging which is unaffected by humidity under any environmental conditions. The toner for developing electrostatic images in accordance with the present invention can therefore be used in a wide range of electronic photographic developers.

EXPLANATION OF THE PREFERRED EMBODIMENTS

Figure 1:
FIG. 1 is an electron micrograph of the fractured surface of the block obtained in Example 1.

The spheroidal coloring fine particles in this invention are obtained by suspension polymerization, by known procedures, of a polymerizable monomer with coloring agents. The spheroidal coloring particles thus obtained should have an average diameter of 1 to 100 μm, but preferably of 3 to 50 μm, and more preferably of 3.5 to 20 μm. This particle diameter is extremely important in order to obtain the coloring fine particles of this invention after heat treatment and crushing of the partly fused product. The average diameter of the spheroidal polymer particles produced by other polymerization techniques, for example emulsion polymerization, is normally of the order of 0.1 μm. After heat treatment and crushing, the particles have very different shapes and distributions to the coloring fine particles produced by the method of this invention, and even if they are used as a toner, an image of satisfactory quality cannot be obtained.

The following substances may be used as typical polymerizable monomers in the suspension polymerization. They may either be used alone, or two or more of them may be used in combination: styrene type monomers such as styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene and p-chlorostyrene; acrlylic acid or methacrylic acid type monomers such as methyl acrylate, ethyl acrylate, n-butyl acrylate, isobutyl acrlylate, dodecyl acrylate, stearyl acrylate, 2-ethylhexyl acrylate, methyl methacrylate, ethyl methacrylate, propyl methacrylate, n-butyl methacrylate, isobutyl methacrylate, n-octyl methacrylate, 2-ethylhexyl methacrylate and stearyl metahcrylate; or ethylene, propylene, butylene, vinyl chloride, vinyl acetate and acrylonitrile.

When said polymerizable monomers are made to undergo suspension polymerization, it is desirable to add a suitable cross-linking agent because, by conferring a suitable degree of cross-linking on the spheroidal coloring fine particles obtained, workability during the processes from heat treatment to crushing is improved. If inter-particle fusion proceeds too far in the heat treatment, the efficiency of the crushing process declines; if on the other hand the fusion is inadequate, the full effects of particle surface treatment are not obtained. To ensure that inter-particle fusion proceeds to the proper extent, therefore, it is desirable to add said cross-linking agent to the polymerizable monomer in the proportion of 0.001 to 30 parts by weight or 0.005 to 30 parts by weight, and more preferably in the proportion of 0.002 to 5 parts by weight or 0.05 to 5 parts by weight.

The following substances are typical examples of cross-linking agents:

(A) Compounds with at least 2 unsaturated groups in the molecule which are capable of polymerization, (B) Compounds with at least 1 unsaturated group in the molecule capable of polymerization, and at least one functional group chosen from among carboxyl, sulfonyl and phenyl, (C) Compounds with at least 2 functional groups which can undergo cross-linking by addition or condensation reactions induced by heating, an active energy beam or other suitable means, (D) Polyvalent metal compounds which can undergo ionic cross-linking, (E) Compounds wherein, during the polymerization of the polymerizable monomer component, at least 2 radicals are generated in the molecule by means of heating, an active energy beam or other suitable means.

Examples of type (A) compounds are aromatic divinyl compounds such as divinyl benzene, divinyl naphthalene, and their derivatives, diethylenically unsaturated carboxylic acid esters such as ethylene glycol dimethacrylate, diethylene glycol dimethacrylate, triethylene glycol dimethacrylate, trimethylolpropanetriacrylate, alkyl methacrylate, t-butyl aminoethyl methacrylate, tetraethylene glycol dimethacrylate and 1,3-butadiol dimethacrylate; all divinyl compounds including N,N-divinyl aniline, divinyl ether, divinyl sulfide and divinyl sulfonic acid; and all compounds with 3 or more vinyl groups.

Other examples are polybutadiene, polyisoprene, unsaturated polyesters and reactive polymers listed in Patent Publications No. SHO 57(1982)-56,507, Japanese Patent Laid-Open Nos. SHO 59(1984)-221,304, SHO 59(1984)-221,305, SHO 59(1984)-221,306 and SHO 59(1984)-221,307.

Examples of type (B) compounds are compounds which, during polymerization of the monomer component, confer a cross-linked structure on the spheroidal coloring fine particles by reacting with reactive groups remaining in the polymer part of the carbon black graft polymer, e.g. aziridine, oxazoline or epoxy. In order to the cross-linking reaction proceeds more efficiently, monomers with functional groups such as aziridine, oxazoline, epoxy, N-hydroxyalkylamide and thioepoxy (B-i) may be incorporated in the polymerizable monomer component. The following are typical example of monomers (B-i):

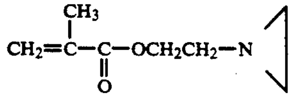

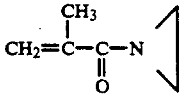

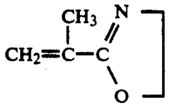

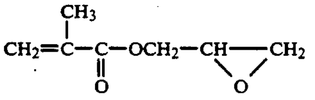

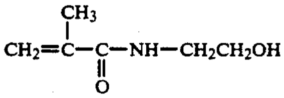 and

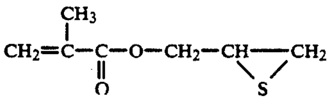

Example of type (C) compounds are low molecular weight of high molecular weight compounds with at least 2 epoxy or oxazoline groups in the molecule, e.g. polyepoxy compounds (Denakol EX-211, Denakol EX-313, Denakol EX-314 and Denakol Ex-321, Nagase Kasei Kogyo K. K.), 2-(p-phenylene)-bis-2-oxazoline, 2,2'-(1,3-phenylene) bis (2-oxazoline), 2-(1-aziridinyl)-2-oxazoline, and RPS (Dow Chemical: reactive polystyrene). RPS has the following general formula:

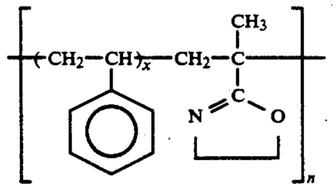

where x is 99, and n is the interger 4 or 5. If type (C) compounds are used as cross-linking agents, however, monomers with groups that can react with the functional groups in the type (C) compounds (C-i) must be included in the polymerizable monomer component. Typical examples of said monomers (C-i) are type (B-) compounds.

Examples of type (D) compounds are ZnO, $Zn(OH)_2$, $Al_2O_3$, $Al(OH)_3$, MgO, $Mg(OH)_2$, sodium methoxide and sodium ethoxide. If type (D) compounds are used for cross-linking, however, type (B) compounds must be included in the polymerizable monomer component.

Examples of type (E) compounds are chlorosulfonated polyolefins represented by the formula:

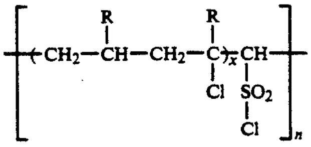

where R is H or $CH_3$, x is an integer from 3 to 400 and n is an integer no less than 2.

The coloring agents used to obtain the spheroidal coloring fine particles are dyes and pigments known to those skilled in the art, and may be either organic or inorganic. Specific examples are carbon black, nigrosine dye, aniline blue, Kalco oil blue, chrome yellow, ultramarine blue, Dupont oil red, quinoline yellow, methylene blue chloride, phthalocyanine blue, malachite green oxalate, lamp black, oil black, azo oil black, and Rose Bengal. If necessary, 2 or more of these may be used in combination.

Magnetic substances and materials may also be used as coloring agents. These magnetic materials may for example be powders of strongly magnetic metals such as iron, cobalt or nickel, or metal compounds such as magnetites, hematite and ferrite, and may be used as coloring agents either alone or in combination with said dyes or pigments.

These coloring agents may be used without modification. If, however, they are to be used as a toner, for example, it is preferable to carry out a surface treatment by a convenient method to distribute the coloring agent uniformly throughout the particles as this gives a high quality image. If carbon black is to be used as the coloring agent, the carbon black graft polymer described in U.S. application Ser. No. 134,319 is suitable. Further, if coloring agents other than carbon black are to be used, the surface-treated agents obtained by the method described in Japanese Patent Laid-Open No. HEI 1(1989)-118573 are suitable.

The amount of coloring agent to be added can be varied within wide limits depending on the its type and the purpose for which the coloring fine particles obtained are to be used, but it is preferable that their proportion is 1 to 200 parts by weight, and more preferably 1 to 100 parts by weight to 100 parts by weight of polymerizable monomer. In order to obtain spheroidal coloring fine particles from the coloring agent, it is usually most convenient to carry out a suspension polymerization of a polymerizable monomer in which said coloring agent has been dissolved or dispersed. In some cases, however, the coloring agent may be caused to be absorbed by spheroidal polymer particles after polymerization by means of a suitable solvent.

The stabilizers used in the suspension polymerization may be water-soluble, high molecular weight compounds such as polyvinyl alcohol, starch, methyl cellulose, carboxymethyl cellulose, hydroxyethyl cellulose, sodium polyacrylate and sodium polymethacrylate; surfactants such as anionic surfactants, cationic surfactants, amphoteric surfactants and nonionic surfactants; and barium sulfate, calcium sulfate, barium carbonate, magnesium carbonate, calcium phosphate, talc, clay, diatomaceous earth or metal oxide powders.

The anionic surfactants specified here may for example be salts of fatty acids such as sodium oleate and castor oil potash, salts of alkyl sulfate esters such as lauryl sodium sulfate and lauryl ammonium sulfate, salts of alkyl benzene sulfonic acids such as dodecyl benzene sodium sulfonate, salts of alkyl naphthalene sulfonic acids, salts of dialkyl sulfosuccinic acids, salts of alkyl phosphate esters, condensation products of naphthalene sulfonic acid and formalis, or salts of polyoxyethylene alkyl sulfate esters.

The nonionic surfactants specified here may for example be polyoxyethylene alkyl ethers, polyoxyethylene alkyl phenol ethers, polyoxyethylene fatty acid esters, sorbitan fatty acid esters, polyoxysorbitan fatty acid esters, polyoxyethylene alkyl amines, glycerol fatty acid esters, and block polymers of oxyethylene and oxypropylene.

The cationic surfactants specified here may for example be salts of alkyl amines such as laurylamine acetate and stearylamine acetate, or tertiary ammonium salts such as lauryl trimethylammonium chloride.

An example of an amphoteric surfactant is lauryl dimethylamine oxide.

The composition and quantity of these stabilizers should be suitably adjusted such that the diameter of the spheroidal coloring particles obtained is 1 to 200 μm, preferably 3 to 5 μm, most preferably 3.5 to 20 μm. If for example water-soluble compounds of high molecular weight are used as stabilizers, the quantity added should be 0.01 to 20% by weight, and more preferably 0.1 to 10% by weight, with respect to the quantity of polymerizable monomer components. If surfactants are used, the quantity added should be 0.01 to 10% by weight, and more preferably 0.1 to 5% by weight, with respect to the quantity of polymerizable monomer component.

As polymerization initiators, any of the oil-soluble peroxides or azo initiators commonly used for suspension polymerizations may be used here. Examples are peroxide initiators such as benzoyl peroxide, lauroyl peroxide, octanoyl peroxide, orthochlorobenzoyl peroxide, orthomethoxybenzoyl peroxide, methyl ethyl ketone peroxide, di-isopropyl peroxydicarbonate, cumene hydroperoxide, cyclohexanone peroxide, t-butyl hydroperoxide, and diisopropylbenzene hydroperoxide, or 2,2'-azobisisobutylonitrile, 2,2'-azobis-(2,4-dimethylvaleronitrile), 2,2'-azobis-2,3'-dimethylbutylonitrile, 2,2'-azobis-(2-methylbutylonitrile), 2,2'-azobis-(2,3,3-trimethylbutylonitrile, 2,2'-azobis-2-isopropylbutylonitrile, 1,1'-azobis-(cyclohexane-1-carbonitrile), 2,2'-azobis-(4-methoxy-2,4-dimethylvaleronitrile), 2-(carbamoylazo) isobutylonitrile, 4,4'azobis-4-cyanovaleri acid, and dimethyl-2,2'-azobis isobutylate. It is preferable that these initiators are added in a proportion of 0.01 to 20% by weight, and more preferably 0.1 to 10% by weight, with respect to the quantity of polymerizable monomer.

When the polymerizable monomer components are made to undergo suspension polymerization to give spheroidal coloring fine particles, other polymers such as polyesters may be added to the monomers, and further, known additives such as chain transfer agents may also be mixed in a suitable proportion to control the degree of polymerizaiton. Further, if the coloring fine particles of this invention are used as a toner for developing electrostatic images, magnetic materials or charge control agents may be mixed with the polymerizable monomer so as to give coloring fine particles which also contain said magnetic materials or charge control agents. The properties of the spheroidal coloring fine particles thus obtained have 1 to 100 μm, preferably 3 to 50 μm, most preferably 3.5 lo 20 μm of average particle size, and the distubution of the particle diameter 0 to 80%, preferably 1 to 50% of variation coefficient.

The spheroidal coloring fine particles obtained by the above procedure are heated to 30° to 200° C. to fuse them together, and then crushed to substantially the same average particle diameter of the spheroidal coloring fine particle before melting to give the coloring fine particles of this invention. The ideal form of the crushing to a substantially the same average particle diameter of the spheroidal coloring particle before melting throughout the specification is the form that the block obtained by fusing the spheroidal coloring fine particles together without completely destroying the particle interfaces is crushed so as to peel throughout the whole interface to separate individual particles at a degree of the unit as the spheroidal coloring fine particle before melting and is restored to a similar shape except that the surface state of the spheroidal coloring fine particle before melting is changed. However, it is actually difficult to control the fused state of the whole fused surface, so the coloring fine particles actually obtained is a mixture of particles wherein the spheroidal coloring fine particles before fusing and crushing is deformed or partially defected and particles wherein the defected portion is adhered to the particles. Such mixture is substantially the same property compared to the ideal form, if it has substantially the same average particle diameter as that of the spheroidal coloring fine particles before melting. In such case, if the average particle diameter of the colored fine particle is generally within 20%, preferably within 10%, more preferably within 5% to the average diameter of the spheroidal coloring fine particles, the average particle diameter of the coloring fine particles of the present invention can be deemed is substantially the same as that of the spheroidal coloring fine particles. This heat treatment is an extremely important and necessary process to modify the surface of the spheroidal coloring fine particles. If the heating temperature is less than 30° C., either inter-particle fusion does not occur at all or if it does it is incomplete, and as a result, there is no clear modification of the particle surface. If on the other hand the temperature exceeds 200° C., fusion proceeds too far and this not only renders the subsequent crushing process difficult, but also causes the coloring fine particles obtained to have a very large particle size distribution. It is preferable that the temperature is within the range 50° to 150° C. The spheroidal coloring fine particles fuse together in this heating process, but the fusion should be controlled depending on the effect it is desired to obtain. In order to obtain a uniform particle distribution in the subsequent crushing process, and therefore particles which have superlative physical properties for use as a toner for developing electrostatic images, it is preferable that fusion does not completely destroy the particle interfaces, or in other words, that the particle boundaries remain. The state of the fused material with remaining particle boundaries can easily be verified by breaking the block so obtained, and examining the fractured surface with the aid of an electron micrograph (see FIG. 1). The fusion should also be such that the bulk density of the block so obtained is 0.1 to 0.9 $g/cm^3$, preferably 0.2 to 0.7 $g/cm^3$. This heat treatment can be carried out on the spheroidal coloring fine particles after drying, or in some cases at the same time as the drying process. It may also be carried out under normal pressure, reduced pressure or increased pressure. Further, suitable organic solvents may also be used freely during the heat treatment to promote the fusion.

The coloring fine particles of this invention may be obtained by mixing the spheroidal coloring fine particles obtained by the above procedure with inorganic and/or organic particles, subjecting them to heat treatment at 30° to 200° C. to cause inter-particle fusion, and crushing the product.

Said inorganic and/or organic fine particles maintain the inter-particle fusion at an optimum level, remarkably improve the crushability of the product, and confer good physical properties on the coloring particles obtained after crushing.

Said inorganic and/or organic fine particles must, therefore, be smaller than the coloring- fine particles, and should preferably be chosen such that their diameter is no greater than ½ of that of the latter.

Examples of inorganic fine particles are powders or particles of alumina, titanium dioxide, barium titanate, magnesium titanate, strontium titanate, lead oxide, quartz sand, clay, mica, wollastonite, diatomaceous earth, inorganic oxide pigments, chromium oxide, cerium oxide, red oxide, antimony trioxide, magnesium oxide, zirconium oxide, barium sulfate, barium carbonate, calcium carbonate, silica fines, silicon carbide, silicon nitride, boron carbide, tungsten carbide, titanium carbide and cesium carbide, or particles of yellow pigments such as chrome yellow, zinc yellow, cadmium yellow, yellow iron oxide, mineral fast yellow and nickel titanium yellow; orange pigments; red pigments such as red iron oxide, cadmium red, red lead and mercury cadmium sulfide; violet pigments such as manganese violet; blue pigments such as Milori blue and cobalt blue; and green pigments such as chrome green or chromium oxide. These may either be used alone, or 2 or more of them may be used in conjunction.

These inorganic fine particles may also be treated by known hydrophobic processing techniques such as titanium coupling agents, silane coupling agents or metal salts of higher fatty acids.

Example of organic fine particles are cross-linked or non cross-linked polymer particles, organic pigments, charge control agents and waxes.

Typical cross-linked or non-cross-linked resin fine particles are those of resins which contain copolymers such as styrene resin, acrylic resins, methacrylic resins, polyethylene resins, polypropylene resins, silicon resins, polyester resins, polyurethane resins, polyamide resins, epoxy resins, polyvinyl butyral resins, rosin resins, terpene resins, phenol resins, melamine resins, and guanamine resins. These may either be used alone, or 2 or more may be used in combination.

Typical organic pigments are black pigments such as carbon black, acetylene black, lamp black and aniline black; yellow pigments such as nobles yellow, naphthol yellow-S, Hansa yellow-G, Hansa-yellow-10G, benzidine yellow-G, benzidine yellow-GR, yellow-GR, quinoline yellow lake, permanent yellow-NCG and tartrazine lake; orange pigments such as molybdenum orange, permanent orange-GTR, pyrazolone orange, vulcan orange, indanthrene brilliant orange-RK, benzidine orange-G and indanthrene brilliant orange-GK; red pigments such as permanent red-4R, lithol red, pyrazolone red-4R, calcium salt of Watchung red, lake red-D, brilliant carmine-6B, eosin lake, rodamine lake-B, arizarine lake and brilliant carmine-B; violet pigments such as fast violet-B and methyl violet lake; blue pigments such as alkali blue lake, victoria blue lake, phthalocyanine blue, non-metal phthalocyanine blue, the partial chloride of phthalocyanine blue, fast sky blue and indanthrene blue-BC; and green pigments such as pigment green-B, malachite green lake and fanal yellow green. These may either be used alone, or 2 or more may be sued in conjunction.

Typical charge control agents are particles of substances known to have this action in the field of electronic photography such as nigrosine, monoazo dyes, zinc hexadecyl succinate, alkyl esters or alkyl amines of naphthoic acid, nitrofunic acid, N-N'-tetramethyldiamine benzophenone, triazine and metal complexes of salicylic acid. These may either be used alone, or 2 or more may be used in combination Typical waxes are polymers with a cylcic method softening point of 80° to 180° C., high melting paraffin waxes with a melting point of 60° to 70° C., fatty acid esters and their partial saponification products, high fatty acids, metal salts of fatty acids and high alcohols. These may either be used alone, or 2 or more may be used in conjunction.

There are no particular restrictions on the method of adding these inorganic and/or organic fine particles, and various methods can be used. Examples are prior addition to an aqueous medium when the polymerizable monomer component is polymerized, addition to the suspension of spheroidal coloring fine particles obtained after polymerization, addition to the wet spheroidal coloring fine particles obtained by filtering and washing after polymerization, or dry blending with the spheroidal coloring fine particle powder obtained after drying. From these methods, a suitable method can be chosen and in some cases several methods may be used concurrently.

For these purposes, the inorganic and/or organic fine particles should preferably have an average particle diameter of 0.001 to 10 μm, preferably 0.005 to 5 μm. If the average particle diameter is smaller than 0.001 μm, the addition of the particles may produce no clear improvement, for example as regards crushability or fluidity when they are used as a toner for developing electrostatic images, or as regards cleaning properties and heat offset properties.

If the particle diameter is greater than 10 μm, the effect due to the addition of the particles is less, and may lead to a lower degree of resolution when they are used as a toner for developing electrostatic images.

The quantity of said particles to be added may be varied within wide limits depending on their type and diameter. If the quantity is too small, however, the effect of the addition may be difficult to obtain, conversely if the quantity is too large, there may be adverse effects as regards electrostatic charge and environmental stability when they are used as a toner. It if therefore preferable that their proportion is 0.01 to 100 parts by weight, and more preferably 0.1 to 50 parts by weight, with respect to 100 parts by weight of spheroidal coloring fine particles.

In applying this invention, said organic particles may be used in conjunction with said inorganic particles.

The heat treatment is an extremely important and necessary process to modify the surface of the spheroidal coloring particles. If the heating temperature is less than 30° C., either inter-particle fusion does not occur at all or if it does it is incomplete, and as a result, there is no clear modification of the particle surface. If on the other hand the temperature exceeds 200° C., fusion proceeds too far and this not only renders the subsequent crushing process difficult, but also causes the coloring particles obtained to have a very large particle size distribution. It is preferable that the temperature is within the range 50° to 150° C. The spheroidal coloring fine particles fuse together in this heating process, but the fusion should be controlled depending on the effect it is desired to obtain. In order to obtain a uniform particle distribution in the subsequent crushing process, therefore and particles which have superlative physical properties for use as a toner for developing electrostatic images, it is preferable that fusion does not completely destroy the particle interfaces, or in other words, that the particle boundaries remain. In this regard, the addition of said inorganic and organic particles has a profound effect in achieving this fusion state, because if these particles are added, the particle boundaries are not so easily destroyed even if the heating temperature and time are somewhat excessive. Further, the fusion should be such that the bulk density of the block obtained is 0.1 to 0.9 g/cm$^3$, preferably 0.2 to 0.7 g/cm$^3$. This heat treatment can be carried out after drying the spheroidal coloring particles, or in some cases at the same time as the heat treatment. It can also be carried out under normal pressure, reduced pressure or increased pressure. Further, suitable organic solvents may be used freely during the heat treatment in order to promote the fusion.

Crushing of the product may be carried out by means of any crusher used industrially to produce powders and particles.

The average particle size and particle size distribution of the coloring fine particles so obtained may be freely controlled. The average particle diameter should however, preferably be 1 to 100 μm, more preferably 3 to 50 μm, and most preferably 3.5 to 20 μm. The variation coefficient of the average particle size in the distribution should also preferably be 0 to 80% and more preferably 1 to 50%, this variation coefficient being the percentage value obtained by dividing the standard deviation by the average particle diameter and multiplying by 100.

The toner for developing electrostatic images of this invention is obtained by using said coloring particles, but the average diameter is preferably 3 to 50 μm, more preferably 3.5 to 20 μm in order to obtain an appropriate state of the charging property. The particles may be used without modification as a toner, or additives usually added to toners such as charge regulators to adjust the charge on the particles or fluidizers may also be added in suitable proportions if desired.

There is no particular restriction on the method used to add charge regulators, and any of the known methods may be selected. The charge regulator may, for example, first be included in the monomer before the monomer containing a dispersion of coloring agent is polymerized, or the coloring fine particles of the invention can subsequently be treated with the charge regulator so that the latter adheres to their surface.

We shall now describe this invention in more detail by means of the following embodiments, but it should be understood that they are not exhaustive and the invention is not limited to them in any way. All proportions specified are proportions by weight.

Synthesis 1

200 parts of deionized water containing 0.1 parts of polyvinyl alcohol in solution was introduced into a flask equipped with a stirrer, inert has supply tubing, a reflux condenser and a thermometer. A mixture of a polymerizable monomer containing 97.5 parts of styrene and 2.5 parts of glycidyl methacrylate which had been prepared beforehand, and 8 parts of benzoyl peroxide dissolved in the monomer, was introduced into the flask and then stirred at high speed so as to obtain a uniform suspension. The mixture was heated to 80° C. while blowing in nitrogen gas, and stirring contained for 5 hours at this temperature. After carrying out the polymerization reaction, water was removed, and a polymer with reactive epoxy groups was thus obtained.

40 parts of the polymer having reactive epoxy groups was kneaded together and reacted with 15 parts of the carbon black MA-100R (Mitsubishi Kasei Kogyo K.K.) and 1 part of a charge control agent (Aizen Spilon Black TRH, Hodogaya Kagaku Kogyo K. K.) in a Labo Plastomill at 160° C. at 100 rpm. The product was then cooled and crushed to obtain a carbon black graft polymer to be used as coloring agent.

897 parts of deionized water containing 3 parts of dissolved polyvinyl alcohol (PVA 205 Kuraray K. K.) was introduced into a similar flask to the above. A mixture of a polymerizable monomer component containing 80 parts of styrene, 20 parts of n-butyl acrylate and 0.3 parts of divinyl benzene, which had been prepared beforehand, together with 50 parts of said carbon black graft polymer as coloring agent, 3 parts of azobisisobutylonitrile and 3 parts of 2,2'-azobis (2,4-dimethylvaleronitrile) was then introduced, and the resulting mixture stirred at 8000 rpm by a T. K. Homomixer (Tokushuki Kika Kogyo K. K.) for 5 min so as to obtain a uniform suspension. The mixture was heated to 60° C. while blowing in nitrogen, and stirring was continued at this temperature for 5 hours. After carrying out the suspension polymerization reaction, the mixture was them cooled, and the suspension of spheroidal coloring fine particles (1) was obtained. The suspension (1) was examined in a Coulter Counter (aperture 100 μm), and found to have an average particle diameter of 7.01 μm and variation coefficient of the average particle size of 18.5%.

Synthesis 2

897 parts of deionized water containing 3 parts of dissolved polyvinyl alcohol (PVA 205, Kuraray K. K.) was introduced into a similar flask to that used in Synthesis 1. A mixture of a polymerizable monomer component containing 80 parts of styrene, 20 parts of n-butyl acrylate and 0.3 part of divinyl benzene, which had been prepared beforehand, together with 5 parts of brilliant carmine 6B (Noma Kagaku K. K.) as coloring agent, 3 parts of azobisisobutylonitrile and 3 parts of 2,2'-azobis (2,4-dimethylvaleronitrile) was then introduced, and the resulting mixture stirred at 8000 rpm by a T. K. Homomixer (Tokushuki Kakogyo K. K.) for 5 minutes so as to obtain a uniform suspension. The mixture was heated to 60° C. while blowing in nitrogen, and stirring was continued at this temperature for 5 hours. After carrying out the suspension polymerization reaction, the mixture was then cooled to room temperature, and the suspension of spheroidal coloring fine particles (2) was obtained. The suspension (2) was examined in a Coulter Counter (aperture 100 μm), and found to have an average particle diameter of 5.55 μm and variation coefficient of the average particle size of 19.8%.

Synthesis 3

The procedure was the same as in Synthesis 1, except that in place of 50 parts of carbon black graft polymer, 45 parts of a powdered magnetic material, Mapico BL-200 (Titan Kogyo K. K.) were used instead, and the suspension of spheroidal coloring fine particles (3) was obtained. The suspension (3) was found to have an average particle diameter of 9.05 μm and variation coefficient of the average particle size of 19.1%

Synthesis 4

The procedure was the same as in Synthesis 1, except that in place of 3 parts of polyvinyl alcohol 1 part of a nonionic surfactant, Nonipol 200 (Sanyo Kasei K. K.) was used instead, and the mixture was stirred at 6000 rpm by a T. K. Homomixer. The suspension of spheroidal coloring fine particles (4) was obtained and when examined in a Coulter Counter (aperture 100 μm.), it was found to have an average particle diameter of 5.82 μm and variation coefficient of the average particle size of 21.5%.

Synthesis 5

Carbon black graft polymer was obtained by a similar method to Synthesis 1, and 897 parts of deioninzed water containing 1 parts of dissolved anionic surfactant (Hytenol N-08, product of Daiichi Kogyo Seiyaku K. K.) was introduced into a similar flask to that used in Synthesis 1. A mixture of a polymerizable monomer component containing 80 parts of styrene, 15 parts of n-butyl acrylate and 5 parts of polybutadiene (NISSO-PB-3000, product of Nippon Soda K. K.) which had been prepared beforehand, together with 50 parts of carbon black graft polymer, 2 parts of azobisisobutylonitrile and 1 part of 2,2'-azobis (2,4-dimethylvaleronitrile) was then introduced and a similar operation to synthesis 1 was carried out to obtain suspension (5) of the spheroidal coloring fine particle. The suspension (5) of spheroidal coloring fine particles (5) was examined in a Coulter Counter (aperture 100 μm) to find that an average particle diameter is 6.30 μm and variation coefficient of the average particle size is 19.3%.

Synthesis 6

The procedure in Synthesis 5, except that in place of 5 parts of polybutadiene 5 parts of HYPALON 20 (product of E. I. duPont de Nemors & Co.) and in place of 2 parts of azobisisobutylonitrile and 1 part of 2,2'-azobis (2,4-dimethylvaleronitrile) 3 parts of benzoyl peroxide were used to obtain suspension (6) of spheroidal coloring fine particles. The suspension (6) was examined in a Coulter Counter (aperture 100 μm) to find that an average particle diameter is 5.91 μm and variation coefficient of the average diameter is 21.5%.

EXAMPLE 1

1050 parts of the suspension (1) of spheroidal coloring fine particles obtained by Synthesis 1 were filtered, washed, then dried and heat-treated by a hot air dryer at 90° C. for 5 hours so as to obtain 150 parts of a fused block like material with the particle boundaries remaining that had a bulk density 0.30 g/cm$^3$. FIG. 1 is an electron micrograph of the fractured surface obtained by breaking this block (magnification x 5,000). After breaking up the block, it was crushed by a Labo Jet Ultrasonic Jet Pulverizer (Nippon Pneumatic Mfg. Co., Ltd.) to obtain the coloring fine articles having fine unevenness on the surface. (1).

When theses particles (1) were examined in a Coulter Counter (aperture 100 μm), the average particle diameter was found to be 6.98 μm, and the variation coefficient of particle diameter was 18.1%. Table 1 shows the results of using these particles (1) without modification as a toner (1) for developing electrostatic images in an electrostatic photocopier (Type 4060, Ricoh K. K.).

EXAMPLE 2

1005 parts of the suspension (2) of spheroidal coloring fine particles (2) obtained in Synthesis 2, were filtered and washed to give a paste of the particles. 1.3 parts of a colorless charge control agent (Bontron E-84, Orient Kagaku Kogyo K. K.) were then mixed uniformly with this paste. The resulting mixture was dried and simultaneously heat-treated at 120° C. for 2 hours by a hot air dryer so as to obtain 106 parts of a fused block like material with the particle boundaries remaining that had a bulk density 0.35 g/cm$^3$. This block was crushed by the same method as in Example 1 to obtain the red colored fine particles (2). Table 1 shows the properties of these particles (2), and the results of using them without modification as a toner (2) for developing electrostatic images in an electrostatic photocopier (Type 4060, Ricoh K. K.).

EXAMPLE 3

1050 parts of the suspension (1) of spheroidal coloring fine particles obtained in Synthesis 4 were filtered, washed, and then dried at 50° C. under reduced pressure to give 150 parts of spheroidal coloring fine particles. These spheroidal coloring fine particles were heat-treated at 110° C. for 1 hour so as to obtain a fused block like material with the particle boundaries remaining that had a bulk density of 0.28 g/cm$^3$. This block was crushed by the same method as in Example 1 to obtain the coloring fine particles (3). Table 1 shows the properties of these particles (3), and the results of using them without modification as a toner (3) for developing electrostatic images in an electrostatic photocopier (Type 4060, Ricoh K. K.).

EXAMPLE 4

1045 parts of the suspension (3) of spheroidal coloring fine particles containing magnetic material obtained in Synthesis 3 were filtered and washed to give a paste of the particles. 4.1 parts of a water paste charge control agent (Bontron S-34, Orient Kagaku Kogyo K. K.) containing 35% of active constituent was mixed uniformly with the paster of spheroidal particles containing the magnetic material, and the mixture dried and simultaneously heat-treated at 80° C. under a reduced pressure of 40 mmHg for 5 hours so as to obtain 146 parts of a fused block like material with the particles boundaries remaining that had a bulk density of 0.52 g/cm$^3$. This block was crushed by the same method as in Embodiment 1 to obtain the irregularly-shaped coloring fine particles (4).

Table 1 shows the properties of these particles (4), and the results of using them without modification as a toner (4) for developing electrostatic images in an electrostatic photocopier (NP-5000, Canon K. K.).

EXAMPLE 5

1048 parts of the suspension (5) of spheroidal coloring fine particles obtained in Synthesis 5 were filtered, washed, and then dried at 50° C. under reduced pressure to give 150 parts of spheroidal coloring fine particles. These spheroidal coloring fine particles were heat-treated at 90° C. for 1 hour so as to obtain a fused block like material with the particle boundaries remaining that had a bulk density of 0.30 g/cm$^3$. This block was crushed by the same method as in Example 1 to obtain the coloring fine particles (5). Table 1 shows the properties of these particles (5), and the results of using them without modification as a toner (5) for developing electrostatic images in an electrostatic photocopier (Type 4060, Ricoh K. K.).

TABLE 1

| | | | Example 1 | Example 2 | Example 3 | Example 4 | Example 5 | Example 6 | Control 1 | Control 2 |
|---|---|---|---|---|---|---|---|---|---|---|
| | Toner for developing electrostatic images | | (1) | (2) | (3) | (4) | (5) | (6) | Comparison (1) | Comparison (2) |
| Particle properties (N.B.1) | Particle diameter (μm) | | 6.98 | 5.51 | 6.69 | 7.69 | 6.90 | 5.88 | 7.02 | 10.41 |
| | Variation coefficient (%) | | 18.1 | 19.2 | 20.8 | 18.3 | 19.0 | 20.8 | 18.5 | 13.5 |
| | Frictional charge (μc/g) | | −20.1 | −23.3 | −19.5 | −18.6 | −19.7 | −25.0 | −19.2 | −21.3 |
| Image evaluation (N.B.2) | Ambient conditions: 23° C., 60% RH | Fogging | Absent | Absent | Absent | Absent | Absent | Absent | Absent | Absent |
| | | Fine line reproducibility | Good | Good | Good | Good | Good | Good | Good | Poor |
| | | Cleaning properties | Good | Good | Good | Good | Good | Good | Poor | Good |
| | Ambient conditions: 30° C., 90% RH | Fogging | Absent | Absent | Absent | Absent | Absent | Absent | Present | Absent |
| | | Fine line reproducibility | Good | Good | Good | Good | Good | Good | Poor | Poor |
| | | Cleaning properties | Good | Good | Good | Good | Good | Good | Poor | Good |

(N.B.1) Particle properties:
Particle diameter: It was examined in a Coulter Counter (TA-II type, Coulter Electronics, Inc.).
Variation coefficient: It was examined in a Coulter Counter (TA-II type Coulter Electronics, Inc.).
Frictional charge: It was examined in a blow-off powder charge tester (Model TB-200, Toshiba Chemical K.K.) using a mixture (toner concentration: 5% by weight) with iron carrier (DSP-128, Dowa Tetsufun K.K.).
(N.B.2) Image evaluation:

EXAMPLE 6

1048 parts of the suspension (6 of spheroidal coloring fine particles obtained in Synthesis 6 were filtered, washed, and then dried at 50° C. under reduced pressure to give 150 parts of spheroidal coloring fine particles. These spheroidal coloring fine particles were heat-treated at 80° C. for 1 hour so as to obtain a fused block like material with the particle boundaries remaining that had a bulk density of 0.35 g/cm$^3$. This block was crushed by the same method as in Example 1 to obtain the coloring fine particles (6). Table 1 shows the properties of these particles (6), and the results of using them without modification as a toner (6) for developing electrostatic images in an electrostatic photocopier (Type 4060, Ricoh K. K.).

Control 1

1050 parts of the suspension (1) of spheroidal coloring fine particles obtained in Synthesis 1 were filtered, washed, and dried at 50° C. under a reduced pressure of 40 mmHg for 24 hours to obtain 150 parts of the comparison coloring fine particles (1).

Table 1 shows the properties of these comparison particles (1), and the results of using them without modification as a comparison toner (1) for developing electrostatic images in an electrostatic photocopier (Type 4060, ricoh K. K.).

Control 2

228.8 parts of styrene-acrylic resin (TB-1000F, Sanyo Kasei K. K. , 18.7 parts of carbon black (MA-100R, Mitsubishi Kasei K. K. and 2.5 parts of a charge control agent (Aizen Spilon Black TRH) were first mixed by a Henschel mixer, fusion-kneaded at 150° C. for 30 min by a pressure kneader, and cooled to give a lump of toner. This lump of toner was broken up to a powder of 0.1 mm–2 mm particle size by a crusher, reduced to fine powder by an ultrasonic crusher (Labo Jet, Nippon Pneumatic Mfg. Co., Ltd.), and the powder classified by a pneumatic classifier MDS, Nippon Pneumatic Mfg. Co., Ltd.) to obtain 150 parts of the comparison coloring fine particles (2). Table 1 shows the properties of these comparison particles (2), and the results of using them without modification as a comparison toner (2) for developing electrostatic images in an electrostatic photocopier (Type 4060, Ricoh K. K.).

(N.B.1) Particle properties:

Particle diameter: It was examined in a Coulter Counter (TA-II type, Coulter Electronics, Inc.).

Variation coefficient: It was examined in a Coulter Counter (TA-II type Coulter Electronics, Inc.).

Frictional charge: It was examined in a blow-off powder charge tester (Model TB-200, Toshiba Chemical K. K.) using a mixture (toner concentration 5% by weight) with iron carier (DSP-128, Dowa Tetsufun K. K.). (N.B.2) Image evaluation:

It was examined by copying the facsimile test chart No. 1 by an electrostatic copying image tester Typ 4060 of Ricoh K. K. or NP-5000 of Cannon K. K.)

Fogging: It was examined in the existence of phenomenon the ground is stained in spot by the toner.

Fine line producibility: It was evaluated by reading degree of the image obtained by copying the facsimile test chart No. 1.

Cleaning properties: It was evaluated from the image obtained by copying the facsimile test chart No. 1.

EXAMPLE 7

30 parts of Aerosil 200 (silica fine particle produced by Nippon Aerosil K. K.) was added to 10503 parts of suspension (1) of the coloring fine particles obtained in Synthesis 1, and mixed thoroughly. The mixture was filtered, washed, dried and heat-treated by a hot air dryer at 90° C. for 5 hours so as to obtain 1533 parts of a fused block like material with the particle boundaries remaining that had a bulk density of 0.45 g/cm$^3$. This block was broken up, and then crushed by Ultrasonic Jet Pulverizer IDS2 (Nippon Pneumatic Mfg. Co., Ltd.) at a rate of 13 Kg/hr to obtain coloring fine particles having fine unevenness on the surface (7).

When the particles (7) were examined in a Coulter Counter (aperture 100 μm), they were found to have an average diameter of 6.95 μm and a variation coefficient of 17.8%. Table 2 shows the results of using them without modification as a toner (7) for developing electrostatic images. in an electrostatic photocopier (Type 4060, Ricoh K. K.).

EXAMPLE 8

10033 parts of the suspension (4) of spheroidal coloring fine particles obtained in Synthesis 4 were filtered and washed to obtain a paste of the particles. 13 parts of a colorless charge control agent (Bontron E-84, Orient Kagaku Kogyo K. K. and 20 parts of hyperfine calcium carbonate of average particle diameter 0.1 m (inorganic pigment C.I.77220) were then mixed uniformly with this paste. The resulting mixture was dried and simultaneously heat-treated at 135° C. for 2 hours by a hot air dryer so as to obtain 1086 parts of a fused block like material with the particle boundaries remaining that had a bulk density of 0.35 g/cm$^3$. This block was crushed by the same machine as in Example 7 at a rate of 8 kg/hr to obtain the red colored fine particles (8). Table 2 shows the properties of these particles (8), and the results of using them without modification as a toner (8) for developing electrostatic images in an electrostatic photocopier (Type 4060, Ricoh K. K.).

EXAMPLE 9

10503 parts of the suspension (1) of spheroidal coloring fine particles obtained in Synthesis 1 were filtered, washed and dried at 50° C. under reduced pressure for 5 hours to obtain 1503 parts of the particles. 30 parts of Aerosil R-972 (hydrophobic silica, Nippon Aerosil) was added to and mixed uniformly with the particles. The resulting mixture was then heat-treated at 110° C. for 1 hour by a hot air dryer so as to obtain a fused block like material with the particle boundaries remaining that had a bulk density of 0.38 g/cm$^3$. This block was crushed by the same machine as in Example 7 at a rate of 15 kg/hr to obtain the coloring fine particles (9).

Table 2 shows the properties of these particles (9), and the results of using them without modification as a toner (9) for developing electrostatic images in an electrostatic photocopier (Type 4060, Ricoh K. K.).

EXAMPLE 10

10453 parts of the suspension (3) of spheroidal coloring fine particles containing a magnetic material obtained in synthesis (3) were filtered and washed to give a paste of the particles. 41 parts of a water paste charge control agent (Bontron S-34, Orient Kagaku Kogyo K. K.) containing 35% of active constituent, and 29 parts of SEAHOSTER-KE-P30(spherical silica particles of average particle diameter 0.3μm Nippon Shokubai Kagaku Kogyo Co., Ltd.) were mixed uniformly with the paste of spheroidal particles containing the magnetic material, and the mixture dried and simultaneously heat-treated at 80° C. under a reduced pressure of 40 mmHg for 5 hours so as to obtain 1496 parts of a fused block like material with the particle boundaries remaining that had a bulk density of 0.52 g/cm$^3$. This block was crushed by the sa..me machine as in Example 7 at a rate of 35 kg/hr to obtain the coloring fine particles (10).

Table 2 shows the properties of these particles (10), and the results of using them without modification as a toner (10) for developing electrostatic images in an electrostatic photocopier (NP-5000, Canon K. K.).

Control 3

10503 parts of suspension (1) of the coloring particles obtained in synthesis 1 were filtered, washed, dried and heat-treated by a hot air dryer at 90° C. for 5 hours so as to obtain 1503 parts of a fused block like material with the particle boundaries remaining that had a bulk density of 0.30 g/cm3. This block was broke up, and then crushed by Ultrasonic Jet Pulverizer IDS2 (Nippon Pneumatic Mfg. Co., Ltd.) to obtain the comparison coloring fine particles (3).

Table 2 shows the properties of the comparison particles (3), and the results of using them without modification as a comparison toner (3) for developing electrostatic images in an electrostatic photocopier (Type 4060, Ricoh K. K.).

TABLE 2

| | | | Example 7 | Example 8 | Example 9 | Example 10 |
|---|---|---|---|---|---|---|
| | Toner for developing electrostatic images | | (7) | (8) | (9) | (10) |
| | Crushing (pulverizing) rate (kg/hr) (N.B.1.) | | 13.0 | 8.0 | 15.0 | 35.0 |
| Particle properties (N.B.2.) | Particle diameter (μm) | | 6.95 | 5.79 | 6.99 | 8.93 |
| | Variation coefficient (%) | | 17.8 | 20.8 | 18.0 | 18.9 |
| | Frictional charge (μc/g) | | −20.1 | −23.3 | −19.5 | −18.6 |
| | Fluidity | | ◎ | ○ | ◎ | ◎ |
| Image evaluation (N.B.3.) | Ambient conditions: 23° C., 60% RH | Fogging | Absent | Absent | Absent | Absent |
| | | Fine line reproducibility | Excellent | Excellent | Excellent | Excellent |
| | | Cleaning properties | Good | Good | Good | Good |
| | Ambient conditions: 30° C., 90% RH | Fogging | Absent | Absent | Absent | Absent |
| | | Fine line reproducibility | Excellent | Excellent | Excellent | Excellent |
| | | Cleaning | Good | Good | Good | Good |

TABLE 2-continued

| | Example 7 | Example 8 | Example 9 | Example 10 |
|---|---|---|---|---|
| properties | | | | |

(N.B.1) Crushing (pulverizing) rate:
The crushing (pulverizing) rate was taken to be the feed rate using an Ultrasonic Jet Pulverizer IDS2 (Nippon Pneumatic Mfg. Co., Ltd.)
(N.B.2) Particle properties:
Particle diameters and variation coefficients are as shown in Table 1.
Frictional charge:
This was measured by a Blow-Off Powder Charge Meter (Toshiba Chemical K.K.: Model TB-200) using a mixture of the toner with an iron carrier (Dowa Teppun K.K.: DSP-128) (toner concentration 5% by weight)
Fluidity:
The fluidity of the toner was judged by eye.
⊚The toner particles appeared separate, and flowed smoothly.
○The toner particles appeared to stick together somewhat, but flowed normally.
(N.B.3.) Image evaluations are as shown in Table 1.

(N.B.1)Crushing (pulverizing) rate:

The crushing (pulverizing) rate was taken to be the feed rate using an Ultrasonic Jet Pulverizer IDS2 (Nippon Pneumatic Mfg. Co., Ltd.)

(N.B.2) Particle properties:

Particle diameters and variation coefficients are as shown in Table 1.

Frictional charge:

This was measured by a Blow-Off Powder Charge Meter (Toshiba Chemical K. K.: Model TB-200) using a mixture of the toner with an iron carrier (Dowa Teppun K. K.: DSP-128) (toner concentration 5% by weight)

Fluidity:

The fluidity of the toner was judged by eye.

The toner particles appeared separate, and flowed smoothly.

The toner particles appeared to stick together somewhat, but flowed normally.

(N.B.3.) Image evaluations are as shown in Table 1.

EXAMPLE 11

86 parts of a polyolefin fine particle emulsion of average particle diameter of 0.5 μm (active constituent 35%) (Chemipearl S-300 (Mitsui Sekiyu Kagaku Kogyo K. K.) was added to 10503 parts of suspension (1) of the spheroidal coloring fine particles obtained in synthesis 1, and mixed throughly. The mixture was filtered, washed, dried and heat-treated by a hot air dryer at 90° C. for 5 hours so as to obtain 1533 parts of a fused block like material with the particle boundaries remaining that had a bulk density of 0.45 g/cm$^3$. This block was broken up, and then crushed by Ultrasonic Jet Pulversizer IDS2 (Nippon Pneumatic Mfg. Co., Ltd.) at a rate of 11 kg/hr to obtain coloring fine particles (11).

When the particles (11) were examined in a Coulter Counter (aperture 100 μm), they were found to have an average diameter of 6.95 μm and a variation coefficient of 18.0%. Table 3 shows the result of using them without modification as a toner (11) for developing electrostatic images in an electrostatic photocopier (Type 4060, Ricoh K. K.).

EXAMPLE 12

10033 parts of the suspension (4) of spheroidal coloring fine particles obtained in synthesis 4 were filtered and washed to obtain a paste of the particles. 13 parts of a colorless charge control agent (Bontron P-51, Orient Kagaku Kogyo K. K.) and 20 parts of melamine formaldehyde resin fine particles of average particle diameter 0.3 μm, Epostar-S (Nippon Shokubai Kagaku Kogyo Co. Ltd.) were then mixed uniformly with this paste. The resulting mixture was dried and simultaneously heat-treated at 135° C. for 2 hours by hot air dryer so as to obtain 1086 parts of a fused block like material with the particle boundaries remaining that had a bulk density 0.35 g/cm$^3$. This block was crushed by the same machine as in Example 7 at a rate of 12 kg/hr to obtain red colored particles (12). Table 3 shows the properties of these particles (12), and the results of using them without modification as a toner (12) for developing electrostatic images in an electrostatic photocopier (Type SF-7750, Sharp K. K.).

EXAMPLE 13

10503 parts of the suspension (1) of spheroidal coloring fine particles obtained in Synthesis 1 were filtered, washed and dried at 50° C. under reduced pressure for 5 hours to obtain 1503 parts of the particles. 30 parts of hyperfine particles of acrylic cross-linking material MP-3100 (Soken Kagaku K. K.) was added to and mixed uniformly with the particles. The resulting mixture was then heat-treated at 110° C. for 1 hour by a hot air dryer so as to obtain as fused block like material with the particles boundaries remaining that had a bulk density of 0.38 g/cm$^3$. This block was crushed by the same machine as in Example 1 at a rate of 15 kg/hr to obtain coloring fine particles (13).

Table 3 shows the properties of these particles (13) and the results of using them without modification as a toner (13) for developing electrostatic images in an electrostatic photocopier (Type 4060, Ricoh K. K.).

EXAMPLE 14

10453 parts of the suspension (3) of spheroidal coloring fine particles containing a magnetic material obtained in Synthesis 3 were filtered and washed to give a paste of the particles. 41 parts of a water paste charge control agent (Bontron S-34, Orient Kagaku Kogyo K. K.) containing 35% of active constituent, and 29 parts of fine particles of styrene-acrylic material of average particle diameter 0.3 μm (glass transition temperature 60° C.), were mixed uniformly with the paste of spheroidal fine particles containing the magnetic material, and the mixture dried and simultaneously heat-treated at 80° C. under a reduced pressure of 40 mmHg for 5 hours so as to obtain 1467 parts of a fused block like material with the particle boundaries remaining that had a bulk density of 0.52 g/cm$^3$. This block was crushed by the same machine as in Example 1 at a rate of 20 kg/hr to obtain coloring fine particles (14).

Table 3 shows the properties of these particles (14), and the results of using them without modification as a toner (14) for developing electrostatic images in an electrostatic photocopier (NP-5000, Canon K. K.).

(N.B.1.) Particle properties:

Particle diameter:

This was measured in a Coulter Counter (Coulter Electronics Inc. : TA-II).

Variation coefficient:

This was measured in a Coulter Counter (Coulter Electronics Inc.: TA-II).

Frictional charge:

This was measured by a Blow-Off Powder Charge Meter (Toshiba Chemical K. K.: Model TB-200) using a mixture of the toner with an iron carrier (Dowa Teppun K. K. DSP-128) (toner concentration 5% by weight).

(N.B.2.) Image evaluation:

This was performed by copying facsimile test chart No. 1 using electrostatic copier Type 4060, Ricoh K. K., SF-7750, Sharp K. K., or NP-5000, Canon K. K.

Fogging:

The presence or absence of spots in the background due to the toner was investigated.

Fine line reproducibility:

This was evaluated from the ease of reading a copy of facsimile test chart No. 1.

Cleaning properties:

These were evaluated by making a copy of facsimile test chart No. 1.

TABLE 3

| | | | Example 11 | Example 12 | Example 13 | Example 14 |
|---|---|---|---|---|---|---|
| | Toner for developing electrostatic images | | (11) | (12) | (13) | (14) |
| | Crushing (pulverizing) rate (Kg/hr)(N.B.1) | | 11.0 | 12.0 | 15.0 | 20.0 |
| Particle properties (N.B.2) | Particle diameter (μm) | | 6.95 | 5.75 | 6.90 | 8.93 |
| | Variation coefficient (%) | | 18.0 | 20.8 | 17.3 | 18.8 |
| | Frictional charge (μc/g) | | −20.1 | −23.3 | −19.5 | −18.6 |
| | Fluidity | | ○ | ◎ | ◎ | ◎ |
| Image evaluation (N.B.3)* | Environmental conditions: 23° C., 60% RH | Fogging | Absent | Absent | Absent | Absent |
| | | Fine line reproducibility | Excellent | Excellent | Excellent | Excellent |
| | | Cleaning properties | Good | Good | Good | Good |
| | Environmental conditions: 30° C., 90% RH | Fogging | Absent | Absent | Absent | Absent |
| | | Fine line reproducibility | Excellent | Excellent | Excellent | Excellent |
| | | Cleaning properties | Good | Good | Good | Good |

*(N.B.) Crushing (pulverizing) rate, particle properties and image evaluation are the same as in Table 2.

What is claimed is:

1. A method for manufacturing coloring fine particles having fine unevenness on the surface comprising heating spheroidal coloring fine particles having an average particle diameter of 1 to 100 μm obtained by suspension polymerization to a temperature of 30° to 200° C., thereby causing the particles to fuse together in a block without completely destroying the particle interfaces, and the crushing the block to substantially the same average particle diameter of the spheroidal coloring fine particles before melting.

2. A method according to claim 1, wherein said fused bock has bulk density of 0.1 to 0.9 g/cm$^3$.

3. A method according to claim 2, wherein the variation coefficient of particle diameter is 0 to 80%.

4. A method according to claim 1, wherein an average particle diameter of the coloring fine particles is 1 to 100 μm.

5. A method according to claim 1, wherein said spheroidal coloring fine particles are obtained by suspension polymerization of a polymerizable monomer component containing 0.005 to 30% by weight of a cross-linking agent.

6. A method according to claim 1, wherein the coloring fine particles are obtained by incorporating at least one type of particle of small diameter selected from the groups consisting of inorganic and organic particles, with spheroidal coloring fine particles.

7. A method according to claim 6, wherein the average diameter of at least one particle selected from the groups consisting of inorganic and organic particles is within the range of 0.001 to 10 μm.

8. A method according to claim 6, wherein the mixing ratio of at least on particle selected from the groups consisting of inorganic and organic particles is within the range of 0.01 to 100 parts by weight with respect to 100 parts by weight of said spheroidal coloring fine particles.

9. A method according to claim 1, wherein the coloring fine particles are obtained by suspension polymerization of spheroidal coloring fine particles using a carbon black graft polymer as a coloring agent.

10. A method according to claim 1, wherein said spheroidal coloring fine particle is obtained by suspension polymerization of polymerizable monomer component containing 0.001 to 30% by weight of a cross-linking agent.

* * * * *